May 20, 1947. R. POPP Re. 22,882
HOUSING FOR ELECTRIC SWITCHES
Original Filed March 6, 1942
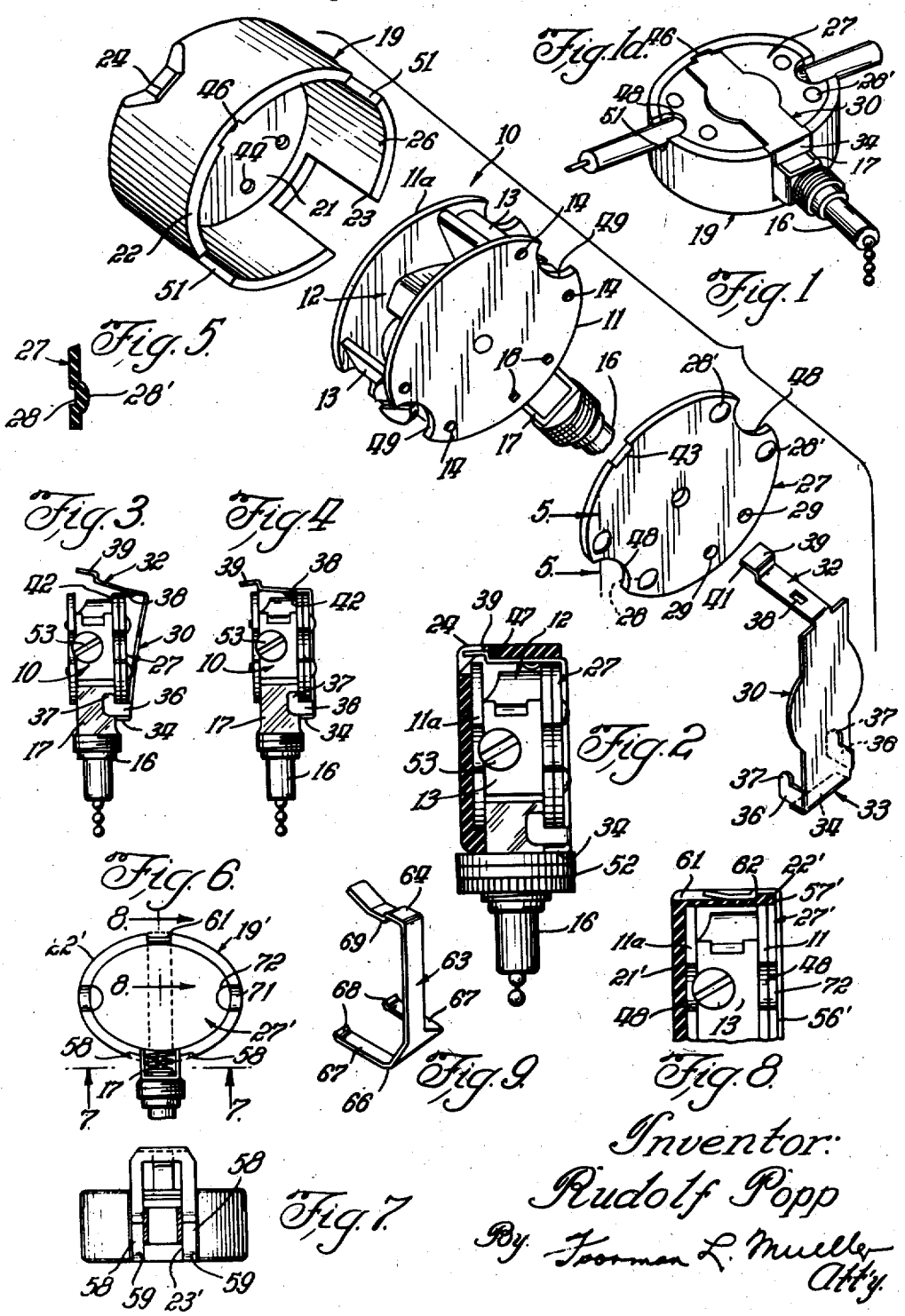
Inventor:
Rudolf Popp
By Foorman L. Mueller
Att'y.

Reissued May 20, 1947

Re. 22,882

UNITED STATES PATENT OFFICE 22,882

HOUSING FOR ELECTRIC SWITCHES

Rudolf Popp, Valparaiso, Ind., assignor to McGill Manufacturing Company, Valparaiso, Ind., a corporation of Indiana Original No. 2,368,679, dated February 6, 1945, Serial No. 433,657, March 6, 1942. Application for reissue March 14, 1945, Serial No. 582,614

15 Claims. (Cl. 200—168)

This invention relates to electrical switches and in particular to an insulating housing therefor which is comprised of an insulating member with an open side to receive and releasably retain a complete preassembled switch or operating unit.

It is an object of this invention to provide an improved electrical switch.

Another object of this invention is to provide an insulating housing for a preassembled electrical switch which is comprised of but two insulating members retained in assembled position entirely by snap means.

It is also an object of this invention to provide a switch having a preassembled operating unit complete in itself, which by a simple hand operation without tools can be inserted within an insulating casing and releasably retained therein and then readily removed.

A further object of this invention is to provide an insulating housing for an electrical switch which entirely eliminates the insulation and manufacturing difficulties inherent with metal housings.

A still further object of this invention is to provide an insulating housing for an electrical switch which is rugged in construction, comprised of a minimum number of parts which are easily assembled without the use of any special jigs or the like, and adapted to have the parts thereof formed by simple machining operations, to in all provide a housing which can be economically manufactured, and then subsequently can be simply and economically handled by an electrician.

A feature of this invention is found in the provision of an insulating housing adapted for assembly with a switch unit which is completely operative when used apart from the housing.

Another feature is the provision of a one-piece insulating case and a multi-part preassembled operating unit which can be wired up and inserted in the case and then the unit and case can be releasably assembled together merely by the manual insertion of the unit in the case. The complete switch is then ready for operation.

Another feature of this invention is found in the provision of an insulating housing for a switch unit in which portions of the housing and snap means for holding the housing in assembly position coact with certain portions of the switch unit to retain the housing and switch unit against relative movement.

Further objects, features, and advantages of this invention will become apparent from the following description when taken in connection with the accompanying drawing in which:

Fig. 1 is an exploded view in perspective of one embodiment of this invention;

Fig. 1a is top perspective view of the assembled switch of Fig. 1;

Fig. 2 is a transverse sectional view of the invention shown in Fig. 1;

Fig. 3 is an elevational view of a switch unit showing a portion of the housing means in an assembling position;

Fig. 4 is a view illustrated similarly to Fig. 3 showing parts thereof in changed position;

Fig. 5 is a fragmentary sectional view taken along the line 5—5 in Fig. 1;

Fig. 6 shows a modified form of the invention with the member for snap connecting the housing members in an assembling position;

Fig. 7 is a transverse sectional view taken along the line 7—7 in Fig. 6;

Fig. 8 is a fragmentary sectional view as seen along the line 8—8 in Fig. 6; and Fig. 9 is a perspective view of a snap member for releasably connecting the housing portions of Fig. 6 in an assembly position.

Housings for electrical switches are used so extensively at the present time that improvements which result in even a small saving in cost of manufacture mounts to substantial proportions when the housings are made in large quantities. Furthermore, this is not the only element to consider in the overall cost on a switch, for the labor cost on the installation of the switches with housings can likewise be large, and savings resulting from greater ease of installation are extremely important. It is common practice to use metal housings with bodies and covers of snap connected type for electrical switches and particularly those having preassembled switch units or operating units insertable therein and removable therefrom. However, these metal housings have not been entirely satisfactory because of the difficulties in completely eliminating any shorting of the switch therethrough, and the consequent necessity for providing insulating lining means between the housing and the switch unit positioned therein. The cost of manufacturing the parts for these metal housings is appreciably increased not only because of the cost of the insulating lining material required but also by the use of separate machines for forming the housing and the linings therefor. Also special jigs are usually required in assembling the various parts of the housing. In many instances the insulating lining has to be of a special material which not only has satisfactory insulating qualities, but which also possesses sufficient resilience to provide for its expanding against the side walls of the metal housing. Since some of these insulating materials are readily affected by atmospheric conditions a separate storage place for them must be provided. The overhead cost of storage is further increased because of the plurality of parts used in these housings. It is readily apparent that where a metal housing is peculiar to a particular type of switch, the cost of storage and inventory for a plurality of switch types will be appreciable.

In practicing the present invention there is provided an insulating housing member comprised of but two insulating members which are adapted to be snap connected in assembled position by a metal connecting member which can be originally handled by a single manual operation. The housing members and the connecting member are of a construction such that they may be readily formed by simple molding and machining operations. As illustrated in the drawing the switch unit positioned in the housing of this invention is of a preassembled type. In other words the switch unit may be operated either within a housing, or entirely apart from the housing so as to broaden its application to a plurality of different operating conditions. It is to be understood, of course, that the housing can be modified, within the scope of this invention for use with other type switch units and can be considered as a single insulating casing with an open side or face into which is inserted a completely preassembled switch unit. This is formed and insulated so that one side serves as the cover for the open face of the casing and such unit is snap connected into the casing by a yielding portion thereof which engages such casing. The switch unit is adapted to be received entirely within the casing or housing member, which is of cup shape and provided with a slot therein to accommodate mounting stem and actuating portion on the switch. Where a second housing member is employed, this is assembled on the switch unit and functions as a cover for the first housing member when the two members and switch unit are assembled together by a metal snap member which has a portion extended across the cover member. The snap member has one end for locating the second or cover member relative to the switch unit actuating portion, and another end of a construction such that it may be snap engaged with the first housing member. The metal snap member, as well as portions of the housing members are formed to coact with certain portions on the switch unit to retain the switch unit and housing members against relative movement. The assembly operations for the housing members with the preassembled switch unit can all be very quickly and easily accomplished by hand. In assembly the housing members completely enclose the switch unit and because they are composed of molded insulating material shorting of the switch or the connections leading therefrom is entirely eliminated.

Referring to the drawing, one form of the switch housing of this invention is shown in Figs. 1, 1*a*, and 2 with a preassembled switch unit 10 including like spaced insulating side plates 11 and 11*a*, and switch mechanism, indicated generally as 12, disposed between the side plates and supported thereon. The terminal posts 13, two of which are shown for the switch mechanism

12, are provided with extensions adapted to be inserted through corresponding apertures in the side plates 11 and 11*a*, and peened, or otherwise formed at the ends of the extensions to retain the terminal posts in the side plates. The formed or peened ends of the extensions, provide projections or lugs 14 on the outer surfaces of the side plates. An actuator and a mounting portion or stem, for the switch mechanism project outwardly of the switch unit from between the side plates 11 and 11*a*, with the actuator being of the lever or pull-chain type. The actuator 16 extends beyond a supporting member or mounting element 17 having extensions 18 inserted through corresponding apertures in the side plates 11 and 11*a* for mounting the same in such plates.

The housing shown in Figs. 1 and 2 includes a substantially cup-shaped insulating housing member 19 having a wall portion 21 and a continuous rim portion 22 projecting laterally therefrom. The rim portion 22 is formed with a slot 23 for receiving the supporting member 17 when the switch unit 10 is positioned within the housing member 19. Located substantially opposite from the slot 23 and at the junction of the rim portion 22 with the wall portion 21 is an opening 24 in the housing member 19 for a purpose to be later noted.

The open side 26 of the housing member 19 is closed by an insulating cover or plate 27 in a manner now to be described. The housing member 19 is composed of a suitable moldable insulating material. The member 19 is preferably formed by a molding process, while the cover 27 may be stamped out of insulating fiber, or it may be molded if desired. The insulating cover 27 is of a shape corresponding to the shape of the side plates 11 and 11*a* and is adapted to be positioned adjacent either one of said side plates in the assembly of the housing depending upon which side plate is positioned toward the open side of the member 19. For the purposes of this description the invention will be described with the cover 27 being positioned against the side plate 11. The surface of the cover plate 27 placed against the side plate 11 is formed with inset or cavity portions 28 (Fig. 5) corresponding to the lugs 14 and capable of receiving the same. The cavities 28 do not extend entirely through the cover 27, and in fact, each constitutes a pressed or formed cavity, with the top 28' thereof extending above the face surface of the cover by a pressing or forming operation. Therefore the tops 28' provide insulating covers for the ends 14 of the terminal posts 13. Apertures 29 extending completely through the cover plate 27 receive the extensions 18 on the supporting member 17 and are subsequently covered by a connecting strap member 30 as will be explained. It is seen, therefore, that by virtue of the cooperating construction of the cavities and apertures in the cover 27 relative to the side plate 11, and the strap 30 the plate 27 is located and retained in a superposed relation on the side plate 11 and in flush engagement therewith.

Prior to the insertion of the switch unit 10 within the housing member 19, the cover 27 is releasably retained in its superposed position on the side plate 11, by an assembly element comprising a connecting or snap member 30 of substantially U-shape having an intermediate body portion and end portions 32 and 33. The end 33 includes a spacing portion 34 (Figs. 1 and 1a) extending laterally across the connecting member 30, and a pair of spaced legs 36 of substantially L or hook shape having extensions 37 at the free ends thereof projected inwardly with reference to the legs 36. The end portion 32 has a bumped-out lug 38 between the ends thereof and a snap portion 39 near the free end 41 thereof.

With the cover 27 superposed on the side plate 11 in the manner above described, the legs 36 on the connecting member 30 are placed in a straddling position relative to the supporting member 17, with the end portion 32 of the connecting member tilted away from the cover 27. With the legs 36 in this straddling position the connecting member 30 is moved upwardly, as viewed in Fig. 3, to its position indicated in Fig. 4. The spacing portion 34 projects laterally of the body portion a distance substantially equal to the combined transverse dimensions of the side plate 11 and cover 27, with this lateral dimension also defining the spacing of the extensions 37 on the legs 36 laterally away from the body portion. As the connecting member 30 is urged into an assembled position preparatory to snapping it on to the switch unit the extensions 37 are moved into an engaged position with the inner side 42 of the side plate 11 so that the cover 27 and side plate 11 are clamped between the extensions 37 on the legs 36 and the body portion of the connecting member 30, as is also shown in Fig. 3.

Concurrently with the straddling of the supporting member 17 by the legs 36 the end portion 32 of the connecting member 30 is located in a transversely extending groove 43 formed in the periphery of the cover 27 opposite the apertures 29 therein. On inward movement of the member 30 providing for the clamping together of the side plate 11 with the cover 27, the end portion 32 of the member 30 travels in the groove 43 until the lug 38 on the end portion 32 is at the groove 43 and at the outer surface or side of the cover 27 (Fig. 3). Since the connecting member 30 is substantially anchored at its end 33 by the engagement of the legs 36 about the cover 27 and side plate 11, the end portion 32 is pivotally movable, by pressing to the left thereon as viewed in Fig. 3, to in turn move the lug 38 from its position shown in Fig. 3 to its position illustrated in Fig. 4. Since the lug 38 is spaced from the body portion a distance substantially equal to the lateral dimension of the spacing portion 34 and because of the flexibility of the end portion 32, the lug 38 is snapped into its position against the inner surface 42 of the side plate 11. From a consideration of Fig. 4, therefore, it is seen that the cover 27 is held in a superposed position against the side plate 11 by the cooperating action of the ends 32 and 33 of the connecting member 30 with the side plate 11 and cover 27, while the cover 27 is likewise positioned by the lugs 14 and 18 extending into the cavities 28 and apertures 29 respectively.

This insures the original accurate positioning of the cover 27 on the switch and the retention thereof in the predetermined position so that when this assembly is inserted in the housing or casing 19 the cover 27 will fit exactly into the open face to close the same, and at the same time the outer face of the cover 27 will be flush with the rim of the casing.

With the cover 27 thus assembled to the switch unit 10 the switch unit 10 is inserted within the housing member 19, the mounting stem 17 being received in the slot 23. As best shown in Fig. 1 the wall portion or bottom 21 of the housing member 19 is formed with recesses or cavities 44 corresponding to the lugs 14 and extensions 18 projecting from the side plate 11a to locate the switch unit relative to the wall 21. Prior to the positioning of the switch unit 10 within the housing member 19 the end portion 32 of the connecting member 30 is located in a guiding groove 46 formed on the inner periphery of the rim portion 26 of the housing member and extended transversely thereof in alignment with the opening 24. On insertion of the preassembled switch unit within the housing member 19 the snap portion 39 is projected within the opening 24 with the shoulder thereon in snap engagement with the shoulder portion 47 at such opening (Fig. 2). The housing 19 and cover 27, therefore, are snap engaged in assembly position and about the switch unit 10 to completely enclose the same. Corresponding recessed or cut away portions 48, 49 and 51 are provided in the cover 27, side plates 11 and 11a, and housing member 19, respectively, to permit the extension through the housing of conductors for connecting the switch mechanism to connections outside of the housing. A mounting means such as the nut 52 may be threadably engaged with the mounting element or stem 17 to support the housing and switch assembly on a support such as a canopy or the like. As is to be noted from Fig. 2 the spacer portion 34 serves as a flat metal backing against which a washer can be drawn, or this portion will engage a wall of the canopy or the like.

It is to be noted that the terminal screws 53 in the terminal posts 13 may be located on the terminal posts anywhere between the side plates 11 and 11a without in any manner interfering with the operation of the switch unit 10 or its positioning in the housing. The side plates 11 and 11a are similarly formed and adapted for assembly with either the wall portion 21 or the cover 27 so that either side of the switch unit 10 may be initially inserted within the housing member 19. Relative movement between the housing and switch unit is eliminated by the engagement of the side plates 11 and 11a with the end wall 21 and cover 27, respectively, the positioning of the end portion 32 of the connecing member 30 within the guiding groove 46, and the insertion of the mounting portion 17 within the slot 23. The switch unit 10 is received entirely within the confines of the rim portion 22. As is best shown in Fig. 2 the outer face of the cover 27 is flush with the top surface of the rim. The housing portions thus completely enclose the switch mechanism to entirely insulate the same. Since the thickness of the housing is relatively small, and with the cover 27 fitting entirely within the housing member 19, the overall dimensions of the housing and switch assembly are only slightly greater than the overall dimensions of the switch unit 10 alone. A compact and neat appearing housing is thus provided for the switch unit.

Referring to Figs. 6–9 there is shown a modified form of housing for the switch unit 10, the housing being illustrated as including an insulating housing member 19' and an insulating cover 27' therefor. The housing member 19' (Figs. 6 and 8) is of substantially cup-shape having an end wall portion 21' integrally formed with a continuous rim portion 22'. The rim 22' is formed with a slot 23' (Fig. 7) for receiving the mounting portion 17 of the switch unit 10. Adjacent each side of the slot 23 and extending transversely of the rim portion 22′ are grooves 58 having catch portions indicated at 59 in the bottom of each thereof. Arranged substantially opposite from the slot 23′ and in the rim portion 22′ is a third transversely extending groove 61 (Figs. 6 and 8) having a catch portion 62 provided therein. The cover 27′ for the housing member 19′ is of flat form and adapted to be received within the confines of the rim portion 22′.

In the assembly of the housing about the switch unit 10 the switch unit 10 is inserted within the housing member 19 with the mounting portion 17 at the slot 23′ in the rim portion 22′. With the switch unit 10 in this position, the cover 27′ is placed against the side plate 11 of the switch unit and within the confines of the rim portion 22′, the outer surface 56′ of the cover 27′ being flush with the end 57′ of the rim portion 22′. The cover 27′ is retained in this assembly position with the housing member 19′ by means of a metal connecting or snap member 63 of substantially U-shape having laterally extending end portions 64 and 66 (Fig. 9). The end portion 66 is comprised of a pair of spaced legs 67 each of which has a snap portion 68 at the free end thereof. The end portion 64 is comprised of a single extension having a snap portion 69 thereon.

In the assembly of the connecting member 63 with the housing each leg 67 is located in a corresponding one of the grooves 58 to each side of the slot 23′, while the end portion 64 is positioned at the groove 61, this initial assembly position of the connecting member 63 being shown in Fig. 7. On pushing of the connecting member 63 downwardly, as viewed in Fig. 7, the snap portions 68 on the legs 67 are moved into snap engagement with the catch portion 59 in a corresponding groove 58, while the snap portion 69 on the end portion 64 is moved into snap engagement with the catch portion 62 in the groove 61. By virtue of this snap engagement of the connecting member with the housing member 19, and the extension of the connecting member above the cover 27′ the housing member and cover are releasably connected together to completely enclose the switch unit 10. Conductors for connecting the switch mechanism to connections outside of the housing are adapted to be inserted into the housing through corresponding openings 71, 72, and 48 formed in the housing member 19′, cover 27′, and side plates 11 and 11*a*, respectively.

From a consideration of the above description and drawing, therefore, it is seen that the invention provides a completely insulating housing for a switch unit which is retained in assembly position entirely by snap engaging means whereby to completely eliminate the use of securing screws or the like. The parts comprising the housing are easily molded or stamped by the use of simple molds or dies. There are no projections on the casing, for instance, so that the parts of the molds may be constructed to be separated from the casings in a straight line motion and the casings can be removed from the molds in a straight line motion. The snap member for releasably retaining the housing parts in assembly is composed of sheet metal, and designed so as to be easily formed by a stamping or pressing operation.

Because of the flexibility in the assembly of the switch unit with the housing, namely, the initial insertion of either side of the switch unit within the housing and the side tolerances permitted for the location of the terminal screws and the terminal posts relative to the housing, the same general housing construction may be used for a plurality of types of switch units. This flexibility in the application of the housing and the three part construction thereof reduces storage space and hence storage costs to a minimum.

Further savings in the overall cost of the insulating housing as compared to metal housings results from the fact that its assembly is very simple and can be accomplished without the use of any special jigs or the like. By virtue of the housing being snap connected in assembly position it can be completely assembled with the switch unit right at the storage bins. Assembly can be accomplished simply by holding the casing in one hand and inserting the preassembled switch unit in the casing with the other hand and pressing inwardly to snap connect the parts. Disassembly is just as simple and is accomplished by pressing in of the portion 39 or lifting of the portion 69. The molded construction of the housing also provides appreciable savings over metal housings because of the savings in the initial costs of material and the complete elimination of any insulating linings.

Although the invention has been described with specific reference to several preferred embodiments thereof, it is to be understood that it is not to be so limited since changes and modification in the parts and in their general arrangement can be made therein which are within the full intended scope of the invention as defined by the appended claims.

I claim:

1. An insulating housing for a preassembled switch mechanism open at one side and having a catch portion on the inside thereof, said switch mechanism being insertable into said housing and having an insulating portion receivable within said open side to close the same when the mechanism is in position in the housing, and means carried on said switch mechanism for snap-engaging said housing to releasably retain the mechanism in the housing including a yieldable snap portion snapped into retaining position with said catch portion on insertion of said switch mechanism into said housing, and accessible on the outside of the housing for movement to release the mechanism from the housing for separation therefrom.

2. A housing for a preassembled electrical switch mechanism, said switch mechanism having an extending portion, and said housing including a substantially cup-shaped insulating member having an annular cavity therein with a side wall, said side wall having a slot in one portion and a catch portion on an oppositely located portion thereof, with said extending portion being receivable in said slot when the switch mechanism is positioned within said insulating member, an insulating cover for said insulating member adapted to be positioned within said cavity to close the same when the switch mechanism is in position in the housing, means for snap-engaging said insulating member and cover in assembly position including a flat metal member having one portion extending across said cover, a second portion for locating the snap member relative to said catch portion, and a snap portion for snap engagement with said catch portion of the housing, with said metal member being of a width substantially equal to the transverse dimension of said extending portion.

3. A housing for a preassembled electrical switch unit having an operating portion projecting therefrom and at least two conductors thereon for extending through the housing to connections outside said housing, said housing including a substantially cup-shaped insulating housing member with an open side and a side wall having a slot therein for receiving said operating portion when the switch unit is positioned within said housing member, said side wall having a catch portion thereon located substantially opposite said slot, an insulating cover for said housing member adapted to be positioned at said open side within the confines of said side wall and against said switch unit, means for retaining said housing member and cover in assembled positions about said switch unit including a flat substantially U-shaped metal member having an intermediate portion extending across said cover, said metal member being of a width substantially equal to the transverse dimension of said extending portion and having spaced leg portions at one end for straddling said extending portion to locate said metal member relative to said catch portion, and a snap portion at the other end thereof adapted for snap engagement with said catch portion, with said cover and housing member having corresponding openings therein spaced from said metal member for receiving said conductors, with the openings in said cover being in the periphery thereof.

4. A housing for enclosing a preassembled switch mechanism, said housing including a walled insulating housing member open at one side and having a substantially closed opposite side, with a wall of said housing having a catch portion thereon, and means for closing the open side of said housing member including a locking portion and a cover portion for closing said open side, said locking portion including an integral resilient extension projecting within said housing member with its outer free end positioned adjacent said catch portion, a shoulder on said outer end, said outer end, when said open side is being closed, being movable in a direction substantially normal to said opposite side to releasably lock said shoulder with said catch portion, with movement of said outer end in a direction substantially parallel to said opposite side releasing said extension from said housing member, and said housing member being provided with an opening therein to permit manual manipulation of said outer end.

5. A housing for enclosing a preassembled switch mechanism, said housing including a walled insulating housing member open at one side and having a substantially closed opposite side, with the wall of said housing member having a transverse groove therein with a catch portion adjacent one end thereof, and means for closing the open part of said housing member including a locking portion and a cover portion receivable within said open side so as to be substantially flush with the wall of said housing member at said open side when the switch mechanism is in position within said housing, said locking portion including an extension substantially normal to said opposite side having a shoulder adjacent the outer end thereof, said extension being guidably movable in said groove, on locking of said cover and housing member, to releasably lock said shoulder with said catch portion, said extension in locking position being supported in said groove with the outer end thereof within the confines of said opposite side, with movement of said outer end in a direction substantially parallel to said opposite side releasing said extension from said housing member.

6. An insulating housing for completely enclosing a preassembled switch mechanism, said housing including an insulating housing member open at one side and having a catch portion thereon, an insulating cover to close said one side when said switch mechanism is in position in said housing member, and means for supporting said cover on said switch mechanism including a locking portion, with said locking portion being insertable with said switch mechanism into said housing member to engage said catch portion and releasably lock said cover and housing member together, said locking portion being accessible from the outside of said housing for movement relative to said housing to release said switch mechanism for separation from the housing.

7. A housing for enclosing a preassembled switch mechanism, said housing including a walled insulating housing member open at one side and having an aperture extending through the wall thereof, and means for closing the open side of said housing member including a cover portion and a locking portion, said locking portion including an extension substantially at right angles with the cover portion having a shoulder adjacent the outer end thereof, said extension being insertable within said housing upon positioning of said cover portion at the open side, said shoulder engaging the edge of said aperture on the inside of said housing member, and being pushable inwardly of the housing member to release the extension from said housing member.

8. An insulating housing for a preassembled electrical switch unit having a side portion, said housing including an insulating housing member having a wall portion and a rim portion extending laterally from said wall portion, with one of said rim and wall portions having an opening extending therethrough, an insulating cover for said housing member adapted to be superposed on said side portion, and in a housing closing position when the switch unit is in position in the housing member, and means for locking said housing member and cover in assembly relation including a locking portion and means for holding said cover and side portion together in said superposed relation, said locking portion on positioning of said switch unit within said housing member being movable within said housing member toward said opening into locking engagement with the housing member at said opening and being pushable inwardly of the housing member at said opening for release from said housing member.

9. An insulating housing for an electrical switch unit, said housing including an insulating housing member having a wall portion and a rim portion extending laterally from said wall portion having a pair of oppositely disposed transversely extending grooves therein, with each of said grooves having a catch portion therein, an insulating cover for said housing member adapted to be received within the confines of said rim portion when said switch unit is in position in the housing, and means for locking said housing member and cover in assembly position having an intermediate portion extending across said cover, and a plurality of extensions substantially normal to said intermediate portion corresponding to said transverse grooves, with each of said extensions having a locking portion adjacent the outer end thereof for locking engagement with a corresponding catch portion when said locking means is moved in a direction substantially normal to said wall portion, said outer ends of the extensions being within the confines of said wall portion, with movement of one of said extensions outwardly from said housing member releasing said locking means from said housing member.

10. A housing for a preassembled electrical switch unit having an actuating portion projecting outwardly therefrom, said housing including a substantially cup-shaped insulating housing member having a rim portion with a slot therein for receiving said actuating portion when said switch unit is positioned within said housing member, said rim portion having a transverse groove therein to each side of said slot, and a third transverse groove located in the portion thereof opposite said slot, with each of said three grooves having a catch portion therein, an insulating cover for said housing member, and means for locking said housing member and cover in assembly position including a flat substantially U-shaped metal member having a width substantially equal to the transverse dimension of said actuating portion, said metal member having the intermediate portion thereof extended across said cover, and one end portion formed with a pair of spaced legs adapted to be received in a corresponding groove to each side of said slot, with the opposite end portion of said metal member being receivable in said third groove, with each of said legs and opposite end portion of said metal member having a shoulder portion thereon for releasably engaging a catch portion in a corresponding groove, and said one end and opposite end portions being substantially within the peripheral confines of said housing member.

11. A switch assembly housing comprising a cup-shaped housing member adapted to receive the switch assembly therewithin and having a shoulder along one wall thereof, a connecting member including an end portion insertable within said housing member with said switch assembly and provided with locking means engageable with said shoulder to anchor one end of said connecting member to said housing, said connecting member including a second portion extending transversely across the open side of said housing member to embrace said switch assembly and thus retain said switch assembly within said housing member, and means anchoring the opposite end of said connecting member.

12. A switch assembly housing comprising a cup-shaped housing member adapted to receive the switch assembly therewithin and having a shoulder along one wall thereof, a connecting member including an end portion insertable within said housing member with said switch assembly and provided with locking means engageable with said shoulder to anchor one end of said connecting member to said housing member, said housing member having an opening therethrough for permitting manual disengagement of said locking means and said shoulder, said connecting member including a second portion extending transversely across the open side of said housing member to embrace said switch assembly and thus retain said switch assembly within said housing member, and means anchoring the opposite end of said connecting member.

13. An insulating housing for a preassembled switch mechanism comprising, in combination, an insulating housing member open at one side to receive said switch mechanism therewithin and provided with a shoulder portion, and means for locking said mechanism within said housing member including a connecting member provided with an end portion insertable with said switch mechanism into said housing member to engage said shoulder portion, said end portion being accessible from the outside of said housing for movement relative to said housing to release said switch mechanism for separation from said housing.

14. An insulating housing for completely enclosing a preassembled switch mechanism which is provided with a side plate at one side thereof, said housing including an insulating housing member having an open side for receiving said switch mechanism therewithin with said side plate facing toward said open side, an insulating cover plate lying flat against said side plate, a connecting member extending transversely across the outer surface of said cover plate, said connecting member being provided at one end with at least one leg which embraces the edges of said cover and side plate to maintain the same in assembled engagement, said assembly element being provided at its other end with an end portion which is insertable within said housing member with said mechanism, and means including coacting parts of said end portion and said housing member for releasably locking said other end of said element to said housing member.

15. A housing for a preassembled electrical switch unit having a mounting element extending therefrom adapted for use in mounting a switch included in such unit on a support or the like, said housing comprising an insulating housing member having an open side for detachably receiving said switch unit therewithin and being provided with a side wall having an opening for receiving said mounting element, an assembly having one portion thereof disposed adjacent said mounting element and having another portion adapted to extend over a substantial portion of the open side of said housing member to maintain said switch unit and said housing member in assembled relationship, and mounting means cooperable with said mounting element for mounting said unit upon said support or the like and for clampingly engaging said one portion of said assembly element disposed adjacent to said mounting element for thereby holding said assembly element in a position wherein said other portion of said assembly element restrains said housing member and switch unit against disassembly.

RUDOLF POPP.

REFERENCES CITED

The following references are of record in the file of this patent:

UNITED STATES PATENTS

| Number | Name | Date |
|---|---|---|
| 1,633,005 | Despard | June 21, 1927 |
| 1,759,435 | Chryst | May 20, 1930 |
| 2,143,158 | Lefkowitz | Jan. 10, 1939 |
| 2,209,104 | Popp et al. | July 23, 1940 |